United States Patent [19]

Sang-Gwon

[11] Patent Number: 5,231,341

[45] Date of Patent: Jul. 27, 1993

[54] LIMITER CIRCUIT OF SERVO MOTOR CONTROL APPARATUS

[75] Inventor: Lim Sang-Gwon, Kyonggi-do, Rep. of Korea

[73] Assignee: Samsung Electronics Co., Ltd., Suweon, Rep. of Korea

[21] Appl. No.: 944,252

[22] Filed: Sep. 14, 1992

[30] Foreign Application Priority Data

Sep. 18, 1991 [KR] Rep. of Korea ............... 91-16323

[51] Int. Cl.$^5$ .......................... H02P 5/40; G05B 5/01
[52] U.S. Cl. ................................ 318/610; 318/561; 318/609; 318/616
[58] Field of Search ............... 318/560–626, 318/631, 432, 370–381, 800–820, 271, 434; 388/800–830; 364/150–169

[56] References Cited

U.S. PATENT DOCUMENTS

| | | | |
|---|---|---|---|
| 3,668,495 | 6/1972 | Eisele et al. | 318/271 |
| 4,422,022 | 12/1983 | Hill et al. | 318/376 |
| 4,599,549 | 7/1986 | Mutoh et al. | 318/798 |
| 4,611,158 | 9/1986 | Nagase et al. | 318/803 |
| 4,703,246 | 10/1987 | Sakamoto et al. | 318/809 |
| 4,727,303 | 2/1988 | Morse et al. | 318/616 |
| 4,733,149 | 3/1988 | Culberson | 318/561 |
| 4,763,057 | 8/1988 | Danz et al. | 318/809 |
| 4,801,856 | 1/1989 | Wajima | 318/568 |
| 4,801,857 | 1/1989 | Bundy | 318/626 |
| 5,166,873 | 11/1992 | Takatsu et al. | 318/561 |

Primary Examiner—Paul Ip
Attorney, Agent, or Firm—Burns, Doane, Swecker & Mathis

[57] ABSTRACT

A limiter circuit of a servo motor control apparatus can perform limiter control in the right direction or reverse, direction or in both directions of a motor therefore. There is provided a microprocessor for outputting a switching signal by receiving rotating direction data from a motor rotating direction setter, and a converter for digital to analog converting the instantaneous limit value outputted from the microprocessor. Also included is a switching portion for selecting the output of instantaneous limit value outputted from the converter, and a limiter for limiting the amplitude the control voltage outputted the PID controller to within the scope of the instantaneous limit value selected according to the switching operation of the switching portion.

4 Claims, 5 Drawing Sheets

| SW1 | SW2 | FET1 | FET2 |
|-----|-----|------|------|
| on  | off | on   | off  |
| off | on  | off  | on   |
| off | off | off  | off  |

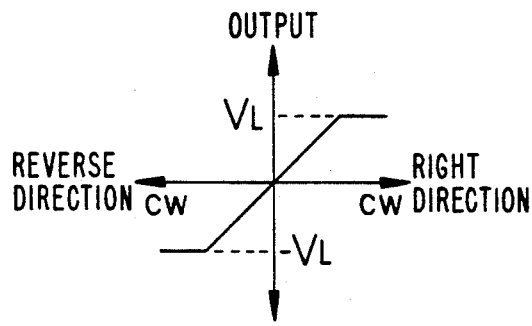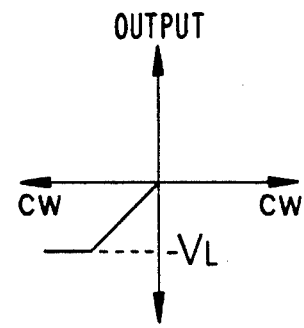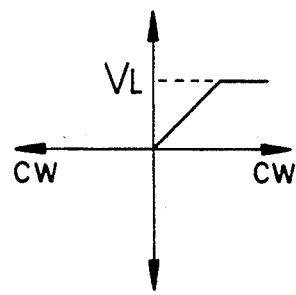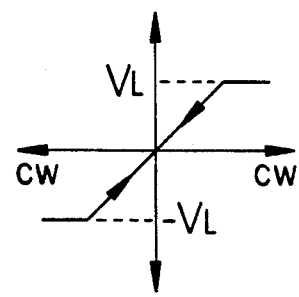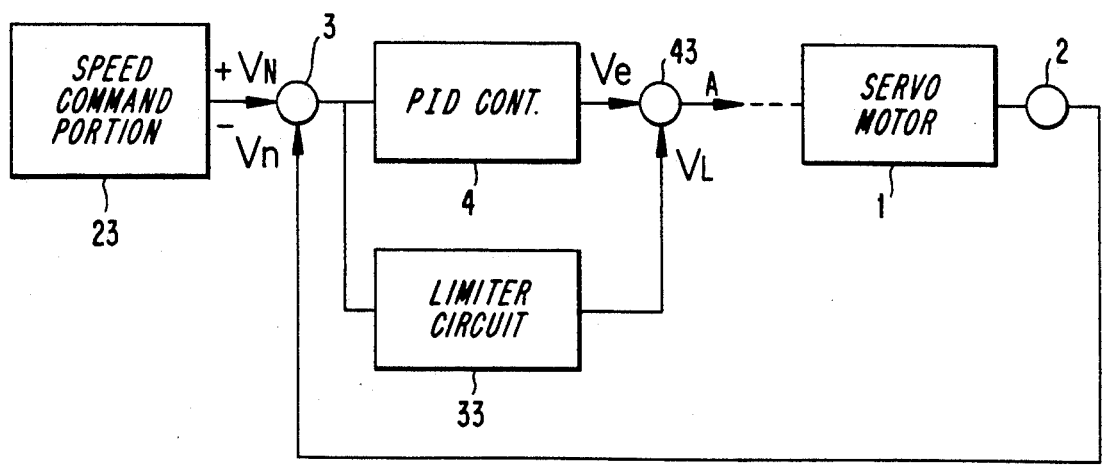

LIMITER CIRCUIT OF SERVO MOTOR CONTROL APPARATUS

BACKGROUND OF THE INVENTION

1. Field of the Invention

The present invention relates to a servo motor for outputting a control signal appropriate for performing rotary control of a servo motor having a PID (Proportional Integral Differentiation) controller, and more particularly to a limiter circuit of a servo motor control apparatus which can perform limit control in the forward direction or reverse direction, or both the forward and reverse directions.

2. Description of the Prior Art

Generally, a PID controller used for automatic control of an AC servo motor, as depicted in FIG. 1, comprises a proportional amplifier 100, an integrating circuit 101 and a differentiation circuit 102.

In the PID controller of the AC servo motor 1, the desired value for servo motor control outputted from a desired value command (not shown) and the actual displaced quantity of the servo motor 1 as driven by the desired value are added at an adder 99. The output signal of the adder 99 is amplified at the proportional amplifier 100. The output signal of the adder 99 is integrated in order to zero the errors of the AC servo motor during the driving. The output signal of the adder 99 is differentiated in order to eliminate the delaying elements of the AC servo motor.

Then, each output signal of the proportional amplifier 100, integrating circuit 101 and differentiation circuit 102 is added at an adder 103 for controlling the AC servo motor 1.

The AC servo motor comprising the PID controller can be operated at a speed the user has preset. The revolution of the servo motor can be adjusted for constant velocity or for appropriate output by utilizing the PID controller as desired to display a rated output power.

When an operation is performed in a condition under which the predetermined revolution is not reached due to an overload even with maximized output of the motor, or when the operation of an instantaneous return to a normal load is performed under an overload condition, or when a start is performed under a condition of the motor being stopped, the PID controller, in particular the integral circuit 101, accumulates errors which show deviations from the desired value. As a result, the output value of the integral signal value accumulated on the integral circuit 101 increases, causing a problem in that the servo motor running excessively.

Furthermore, a great deal of time on the order of hours is spent in order for the output of the increased integral signal value to return to the original condition. This occurs particularly when the overload returns to the normal load or when the motor has been started from a standstill condition. Practical problems in the use of the conventional PID controller.

In order to compensate for the aforementioned problems, as illustrated in FIG. 2, a pair of Zener diodes ZD is connected to the PID controller in two directions for limiting the output in relation to the Zener voltage. However, the Zener voltage of the Zener diodes ZD, once set, cannot be varied when the output limit value changes.

To solve the aforementioned problems, there is provided a rotary control method in Japanese laid open patent application No. Hei 1-94412 as depicted in FIG. 3.

In the rotary control method, the integrating circuit 101 includes a PID controller connected to a limiter 110. The limiter 110 is divided into 2 limiter circuits 105, 106 for controlling the main and auxiliary integral signal values respectively in order to prevent the integral signal value of the integrating circuit from exceeding a limited value.

The conventional rotary control method can freely change the output value of the PID controller within predetermined ranges for control by sliding the variable contacts of variable resistors VR1, VR2. However, the operating condition of the motor changes too often during operation. Consequently, a problem has resulted of being unable to set the output limit value in order to adapt to instantaneously-changing situations.

SUMMARY OF THE INVENTION

Accordingly, it is an object of the present invention to overcome the conventional problem by providing a limiter circuit of a servo motor control apparatus designed to allow manual control of the servo motor by the user's selection of the rotating direction in the forward direction or reverse direction, or in both directions.

It is another object of the present invention to provide a limiter circuit a servo motor control apparatus which sets the output limit value of the servo motor to drive in the forward direction or reverse direction or in both directions by varying freely the output limit value before starting.

It is yet another object of the present invention to provide the limiter circuit of a servo motor control apparatus, which can perform an adaptive control to cope with instantaneously-changing situations by setting up an output limit value which varies according to a displacement variation. The displacement variation is displayed as a difference between the desired value and the actual displaced quantity even during the operation of the motor.

In accordance with one aspect of the present invention, there is provided a limiter circuit mounted on the servo motor control apparatus. The circuit comprises:

a motor rotating direction setter for setting up a rotating direction of the motor by manual control;

an adder for calculating a displaced deviation by adding a desired value to an actual quantity of a motor displacement;

a microprocessor for outputting a control signal by calculating an instantaneous limit value of a motor output after receiving displaced deviation data from the adder and by receiving motor rotating direction data from the motor rotating direction setter;

a converter for converting from digital to analog the instantaneous limit value outputted from the microprocessor;

an inverter for inverting the instantaneous limit value outputted from the converter;

a switching portion for selecting the instantaneous limit value outputted from the converter and the inverter; and a limiter for limiting an amplitude of a control signal outputted from a PID controller within an instantaneous limit value selected according to the switching operation of the switching portion.

The present invention also provides a clamp voltage setting portion which the user can set at the limiter to limit freely the amplitude of control signal outputted from the PID controller by the operation prior to the motor starting.

The present invention will be described in detail in the following in connection with the preferred embodiments thereof with reference to the accompanying drawings.

BRIEF DESCRIPTION OF THE DRAWINGS

For a fuller understanding of the nature and objects of the invention, reference should be made to the following detailed description taken in conjunction with the accompanying drawings in which:

FIG. 7A, FIG. 7B, FIG. 7C and FIG. 7D are graphs for explaining the characteristics of the input vs. output of the limiter circuit in accordance with the present invention; and FIG. 8 is a schematic block diagram of a control apparatus of a servo motor in accordance with the present invention.

DETAILED DESCRIPTION OF THE INVENTION

Figure 1:
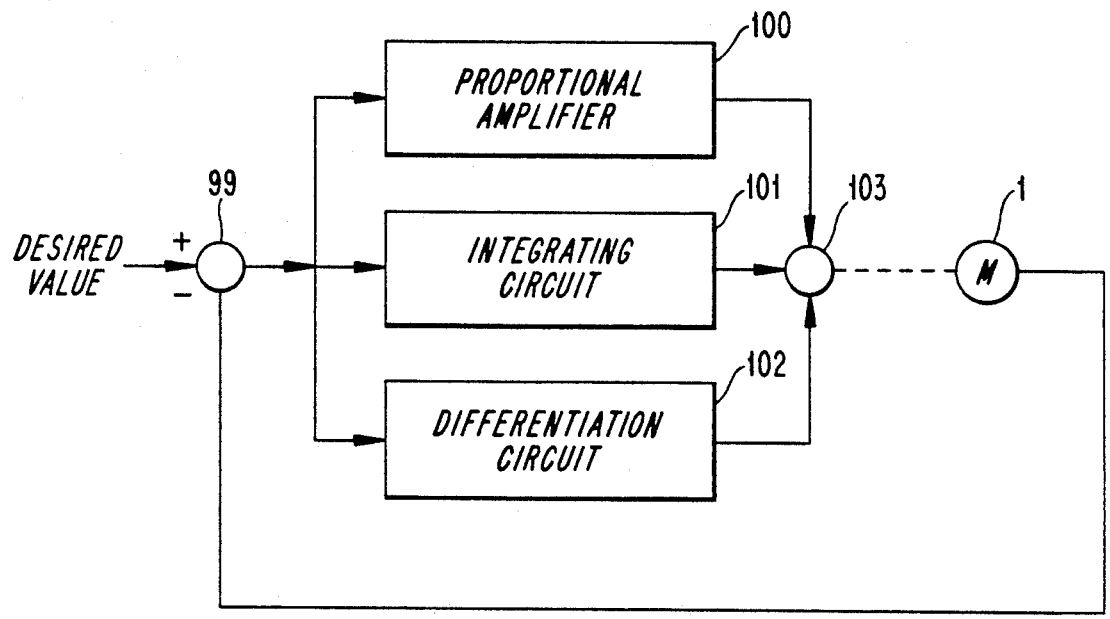
FIG. 1 is a block diagram of a conventional PID controller.
Figure 2:
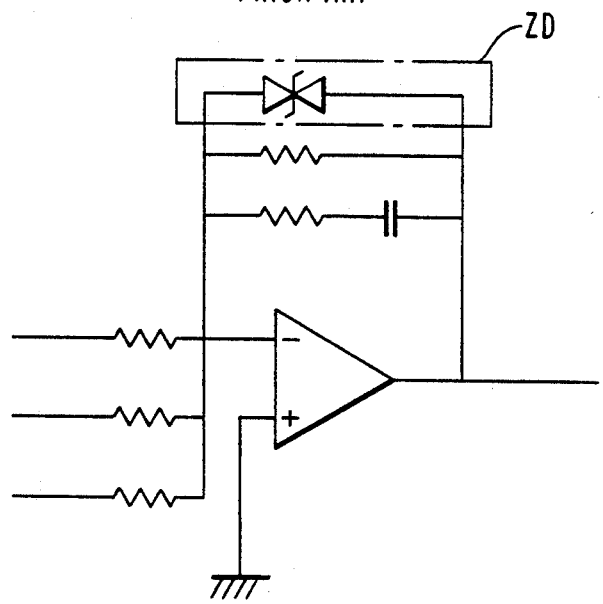
FIG. 2 is a limiter circuit drawing of a conventional servo motor control apparatus.
Figure 3:
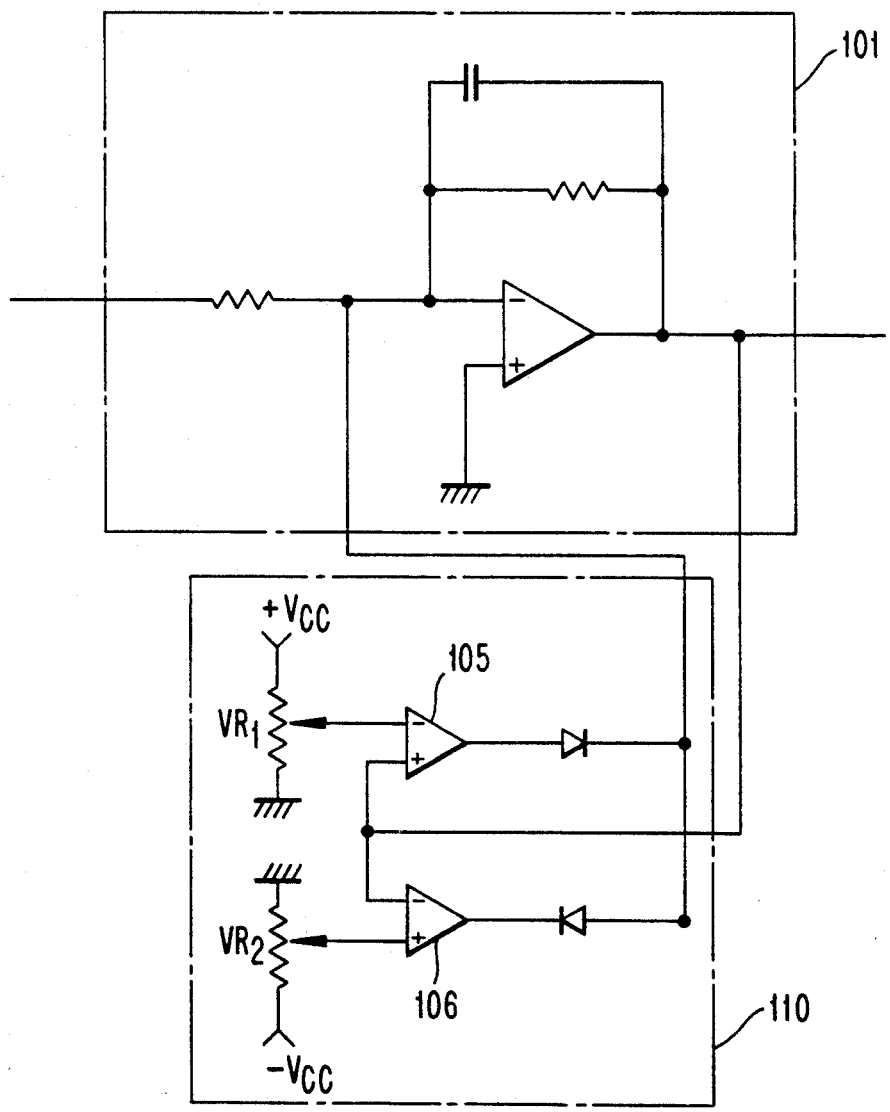
FIG. 3 is a limiter circuit drawing of another conventional servo motor control apparatus.

Detailed explanation will be described in the following in connection with the preferred embodiments of the present invention with reference to the accompanying drawings.

A process of the motor being automatically-controlled is shown in connection with FIG. 8.

As shown in FIG. 8, a shaft (not shown) of the servo motor 1 is installed with a speed detector 2 such as a resolver and the like which are used for a rotary-type generator. The speed resolver 2 generates an analog voltage in proportion to the rotating speed Vn of the motor 1.

Meanwhile, a speed command portion 23 supplies the analog voltage in proportion to a desired value VN to the adder 3, which outputs a displaced deviation e between the desired value VN and an actual displacement quantity Vn to the PID controller 4, which, in turn, generates a control voltage Ve in proportion to the speed deviation VN-Vn corresponding to the control quantity of the servo motor 1.

The adder 3 outputs the speed deviation e to the microprocessor 5 installed inside the limiter circuit 33 of the present invention. The microprocessor 5 outputs an instantaneous limit value VL in proportion to the speed deviation.

Accordingly, the control voltage Ve outputted from the PID controller 4 and the instantaneous limit value VL outputted from the limiter circuit 33 are compared at comparator 43 for controlling the control voltage Ve within the range of the instantaneous limit value VL.

Figure 4:
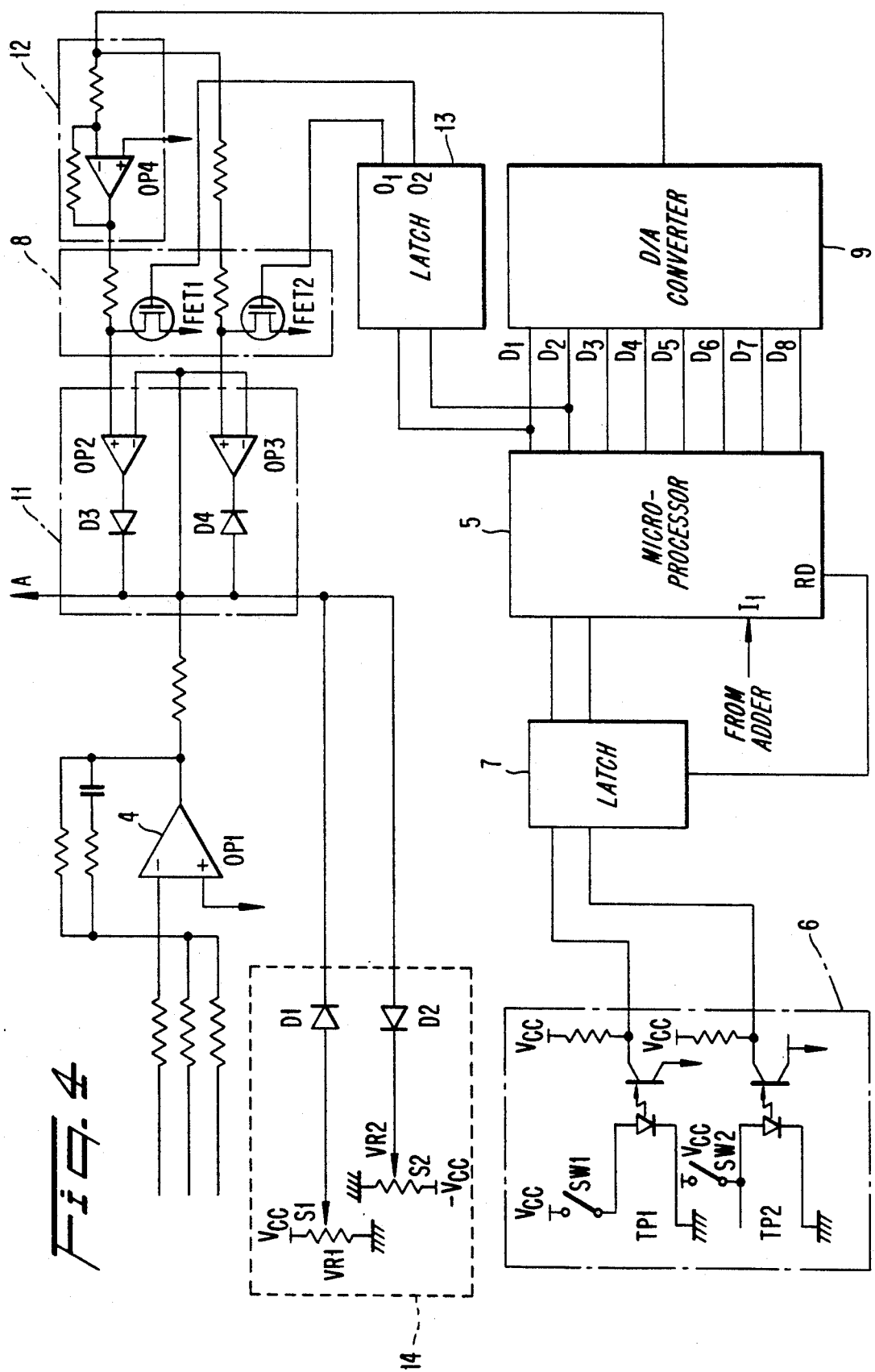
FIG. 4, is a limiter circuit drawing of yet another conventional servo motor control apparatus in accordance with the present invention.

The motor rotating direction setter 6 as shown in FIG. 4 is operated for the microprocessor 5 to determine the rotating direction of the motor by manual control when the servo motor is supposed to be operated in the forward direction or reverse direction, or in both directions. The motor rotating direction setter 6 is constructed with one of each photo diode mounted on photo couplers TP1, TP2 and connected to switches SW1, SW2 which interrupt the power Vcc.

Accordingly, when the user switches the switches SW1, SW2 to selection mode, the data related to the motor rotating direction are latched at a latch portion 7. The microprocessor 5 controls the switching portion 8 comprising field effect transistors FET1, FET2 by determining the rotating direction after receiving the latched data and by accessing the latch portion 7 through read terminal RD.

The input I1 of the microprocessor 5 is, as depicted in FIG. 8, connected with the desired voltage VN of the motor and the adder 3 which outputs the deviation e corresponding to the difference of the actual displaced quantity Vn.

Accordingly, the microprocessor 5 converts the instantaneous limit value of digital shape corresponding to the deviation e to analog shape through D/A(Digital to Analog) converter 9 and outputs the limit value to a limiting portion 11.

Figures 5, 6:
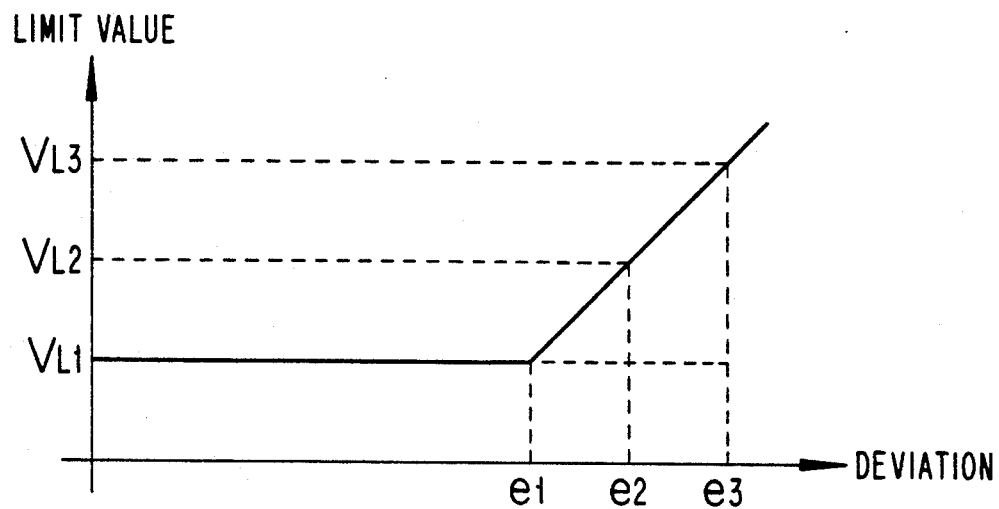
FIG. 5 is a characteristic curve drawing of an instantaneous limit value in accordance with the present invention.
FIG. 6 is a table for explaining the operation of the switching portion depicted in FIG. 4.

In other words, according to the characteristic curve as depicted in FIG. 5, a predetermined instantaneous limit value VL1 is outputted to the limiting portion 11 connected to the output of the PID controller 4 up to the deviation e corresponding to the steady-state deviation e1. When the deviation e deviates from the steady-state deviation e1 increasing to a deviation e2, instantaneous limit value VL is increased to VL2, and may be further increased to VL3 at e3. Thereafter, the limit value is outputted to limiting portion 11 for the prevention of over-run or burn-out of the servo motor.

The microprocessor 5 is programmed with the characteristic curve as illustrated in FIG. 5 before being installed in the apparatus.

By calculating the deviation e in the foregoing according to the program, the instantaneous limit value VL outputted from the microprocessor 5 is converted to an analog value at D/A converter 9 and inputted to the limiting portion 11 comprising O. P. amplifiers (operational amplifier) OP2, OP3. The non-inversion input(+) of the OP2 is connected to an inverter 12 comprising operational an amplifier, OP4, so the O. P. amplifier OP2 is supplied with an inverted analog instantaneous limit value VL. The outputs of the operational amplifiers OP2, OP3 comprise voltage followers that feedback to an inversion input(−) through diodes D3, D4.

As the front ends of the operational amplifiers OP2, OP3 are connected with the switching portion 8 comprising FET1, FET2, the instantaneous limit value VL is selectively inputted to the limiting portion 11 in accordance with operational conditions of switches SW1 and SW2 mounted on the rotating direction setter 6.

In other words, if switch SW1 mounted on the rotating direction setter 6 is turned on, low a signal is outputted from the output O1 of the latch portion connected to the microprocessor 5 and a high signal is outputted from the other output O2 for turning-on FET1 mounted on the switching portion 8, while FET2 maintains the turned-off condition.

In another embodiment, if the switch SW2 only is turned on, FET1 maintains the turned-off condition as depicted in FIG. 6, while FET2 turns on. If the switches SW1, SW2 turn off, FET1 as well as FET2 maintain the turned-off condition.

Accordingly, if switches SW1, SW2 are turned off in order to perform servo control of the rotating direction, the forward direction and reverse direction, as depicted in FIG. 4, FET1, FET2 mounted on the switching portion 8 turn off, so that the instantaneous limit value VL outputted from D/A converter 9 is applied to the non-inversion input(+) of operational amplifiers OP2, OP3 mounted on the limiting portion 11. However, as the operational amplifier OP2 is supplied with the inverted −VL from the inverter 12, the control voltage V2 outputted from the PID controller 4 is limited within the range of the instantaneous limit value VL, −VL at the limiting portion 11.

In other words, if the control voltage Ve outputted from the PID controller 4 becomes higher than the instantaneous limit value VL, a diode D4 connected to the output of the operational amplifier OP3 is turned on to output the instantaneous limit value VL to the output A of the PID controller 4.

When the control voltage Ve becomes lower than the instantaneous limit value −VL the diode D3 connected to the output of operation amplifier OP2 turns on to output the inverted instantaneous limit value −VL to the output A of the PID controller 4. However, if the control voltage Ve is within the range of inequality −VL<Ve<VL, a reverse directional bias is formed in the diodes D3, D4, so that the control voltage V3 can be outputted, and the output waveform thereof is shown in FIG. 7A.

If the switch SW1 mounted on the rotating direction setter 6 is only turned on in order to perform servo control when the motor is rotated in the forward direction, FET1 mounted on the switching portion 8, as illustrated in FIG. 6, turns on and FET2 maintains the turned-off condition, so that the instantaneous reference value VL can be applied to the operational amplifier OP3 in the limiting portion 11 and grounded electric potential can be applied to operational amplifier OP2 due to the turned-on state of FET1.

Accordingly, when the control voltage Ve outputted from the PID controller 4 becomes higher than the instantaneous reference value VL, the diode D4 is turned on, so that the instantaneous reference value VL can be outputted to the output A of the PID controller 4. However, when the control voltage Ve becomes lower than VL, a reverse directional bias is formed in the diode D4, so that the control voltage Ve can be outputted as depicted in FIG. 7B.

If the switch SW2 mounted on the rotating direction setter 6 is turned on to perform servo control when the servo motor is rotated in the reverse direction, FET2 mounted on the switching portion 8 turns on and FET1 turns off, so that instantaneous reference value −VL inverted from the inverter is applied to the non-inversion input(+) of operational amplifier OP2.

Accordingly, when the control voltage Ve outputted from the PID controller 4 becomes lower than the instantaneous reference value −VL causing the diode D3 to turn on, the instantaneous reference value −VL is outputted to the output A of the PID controller. However, when the control voltage Ve is higher than −VL the reverse directional bias is formed in the diode D3, and as depicted in FIG. 7C, the control voltage Ve is outputted.

As in the foregoing, the amplitude of control voltage outputted from the PID controller 4 is limited to the instantaneous reference value VL outputted from the microprocessor 5, and as the value of the instantaneous reference value VL varies in accordance with the deviation e outputted from the adder 3, the control voltage Ve outputted from the PID controller 4 also varies as illustrated in FIG. 7D.

The output of the PID controller 4 in accordance with the present invention is connected with a clamp voltage setting portion 14 along with the limiting portion 11, so that the maximum and minimum values of the control voltage Ve can be set up before the motor is started.

In other words, one end of the variable resistor VR1 which sets the maximum value is connected with a positive voltage source +Vcc, the movable contact S1 of which is then connected to a diode D1. Meanwhile, one end of the variable resistor VR2 which sets the minimum value is connected with a negative voltage source −Vcc, the movable contact S2 of which is then connected to the diode D2. At this point, the diodes D1, D2 are all connected to the output of the PID controller 4.

Accordingly, when the variable resistor VR1 is set as the maximum value VL and the variable resistor VR2 is set as the minimum value −VL, the control voltage Ve outputted from PID controller 4 is limited to a scope of the VL and −VL.

In other words, when the voltage Ve outputted from the PID controller 4 becomes higher than VL, VL is outputted to the output A as the diode D1 is turned on. When Ve becomes lower than −VL, −VL is outputted to the output A as the diode D2 is turned on. However, when the Ve satisfies the inequality, −VL<Ve<VL, the control voltage Ve is outputted as is.

As in the foregoing, the present invention can set the limit reference voltage according to the rotating direction when a rotating instrument is automatically operated in the forward direction, or reverse direction, or in both directions, and the limit reference voltage can be set variably according to the program stored in the microprocessor, and of course the present invention can obtain the effect of limiting the control voltage outputted from the PID controller when the user sets the limit reference voltage by manual operation.

What is claimed is:

1. A limiter circuit for performing rotary control for a motor, said circuit comprising:

means for setting rotational direction data for a motor by manual operation;

means for determining a displacement deviation of said motor;

processing means for receiving said rotational direction data and generating a switching signal and for receiving said displacement deviation and calculating an instantaneous limit value for said motor;

switching means for receiving said switching signal and said instantaneous limit value, and for selecting a limiting signal based on said switching signal, said limiting signal being either said instantaneous limit value or an inverted version of said instantaneous limit value; and means, connected to said switching means, for limiting a control signal for controlling rotation of said motor according to said limiting signal.

2. The limiter circuit of claim 1 further including a PID controller for generating said control signal.

3. The limiter circuit of claim 2 further including means for setting a maximum and a minimum value for said control signal prior to operation of said motor.

4. The limiter circuit of claim 1 further including means for converting said switching signal generated by said processing means from digital form to analog form and transmitting an analog form of said switching signal to said switching means.

* * * * *